METHODS AND MEANS FOR SOLVING PROBLEMS BY PROGRESSIVE ANALYSIS

Original Filed March 23, 1955 2 Sheets-Sheet 1

INVENTORS
CHARLES G. COLEMAN, JR.
HANK WEINER

BY R. J. Tompkins
ATTORNEY

May 16, 1961 C. G. COLEMAN, JR., ET AL 2,984,018

METHODS AND MEANS FOR SOLVING PROBLEMS BY PROGRESSIVE ANALYSIS

Original Filed March 23, 1955 2 Sheets-Sheet 2

INVENTORS
CHARLES G. COLEMAN, JR.
HANK WEINER

BY R. J. Tompkins
ATTORNEY

United States Patent Office 2,984,018

Patented May 16, 1961

2,984,018

METHODS AND MEANS FOR SOLVING PROBLEMS BY PROGRESSIVE ANALYSIS

Charles G. Coleman, Jr., 6712 Joallen Drive, Falls Church, Va., and Hank Weiner, Wiesbaden, Germany (Hq. USAFE, Dcs/Intel, APO 633)

Original application Mar. 23, 1955, Ser. No. 496,357, now Patent No. 2,948,969, dated Aug. 16, 1960. Divided and this application May 29, 1959, Ser. No. 817,006

6 Claims. (Cl. 35—9)

(Granted under Title 35, U.S. Code (1952), sec. 266)

The invention described herein may be manufactured and used by or for the Government of the United States of America for governmental purposes without the payment of any royalties thereon or therefor.

This application is a division of application Serial Number 496,357, filed March 23, 1955 and now Patent No. 2,948,969 for Methods and Means for Solving Problems by Progressive Analysis.

The present invention relates to methods and means for solving problems by progressive analysis and more particularly to methods and means for solving problems by progressive analysis utilizing a card key system.

Many problems, both concrete and abstract, can be solved in a step-by-step manner by a process termed herein as progressive analysis. This process is best explained through considering the solution of a concrete problem such as identification of a destroyer. Of the many methods for solving this problem, the process of progressive analysis is perhaps the most logical. Progressive analysis requires, initially, the knowledge of all solutions to the class of problems of interest, which for this example is the identity of all destroyers. The second step in this analysis involves resolving the problem destroyer into its individual features: number of turrets, length, shape of bow, etc. Then attention is focused on each feature, one at a time. The length could be noted first and this would eliminate from the solutions to the class of problems, all those solutions, i.e. specific destroyer classes, not having the length of this destroyer. Then another feature, such as the number of turrets, could be considered and thereby all destroyer classes of the noted length not possessing the observed number of turrets would be removed from the realm of possible solutions. Thus, as each feature is regarded, the number of possible solutions is diminished. This step-by-step process is continued until only one possible solution remains which possesses all of the features that have been considered, and this must be the true solution to the problem, which for htis example is the class to which the observed destroyer belongs. Progressive analysis is, of course, not limited to the identification of a concrete object. Mathematicians as well as other theorists employ the same process to obtain the solutions to many abstract problems. In the past, the utilization of progressive analysis has required a highly skilled person thoroughly familiar with the class of subjects of interest and having a high intellect enabling him to perform many and perhaps all of the required steps in his mind. Accordingly, the accuracy of the solution has been primarily dependent upon the skill, intellect, and experience of the analyzer, which qualities of course vary with each individual.

The present invention pertains to methods and means for standardization of this step-by-step analysis. A base member is provided having one or more rows of indicia, such as numerals or letters, situated thereon. Each indicium corresponds to one solution: consequently, there are at least as many indicia as there are possible solutions. Another portion of the invention includes cover cards which are adapted to be held in numerous fixed positions on the base. Each card is associated with a characteristic or feature and variations thereof which the solutions and problems may have. Feature indicating means are provided thereon that indicate only those indicia of the base corresponding to solutions having a specific variation of the feature associated with the card. The position of the card on the base member determines the specific variation. In operation, the cards, associated with features of the problem, are superimposed upon the base member until only one indicium remains which is indicated by all of the cards. This indicium corresponds to the true solution of the problem. Through the use of this card system, not only is accurately increased but also relatively unskilled operators can solve problems heretofore requiring the labors of experts. These advantageous results are due to the standardization of operation and to the fact that the operator's attention is never focused, at one time, on the whole problem, i.e. all of the characteristics or features, but rather is limited to the few specific details of one feature.

Accordingly an object of the present invention is the provision of a method and means for solving problems by progressive analysis utilizing standardized concepts and materials.

Another object is to provide method and means for solving problems by progressive analysis capable of utilization by a relatively unskilled operator.

A further object of the present invention is the provision of a system for solving problems by eliminating in a step-by-step manner, according to predetermined relationships between features of the problem and possible solutions, all but one indicium from a group of indicia wherein the indicia have a known association with possible solutions.

Still another object is to provide an indexed base which in cooperation with indicator cards that are superimposed thereon can be utilized to perform a process of progressive analysis.

A still further object of the present invention is the provision of indicator cards which in cooperation with an indexed base can be utilized to perform a process of progressive analysis.

Other objects and many of the attendant advantages of this invention will be readily appreciated as the same becomes better understood by reference to the following detailed description when considered in connection with the accompanying drawings wherein.

Figure 1:
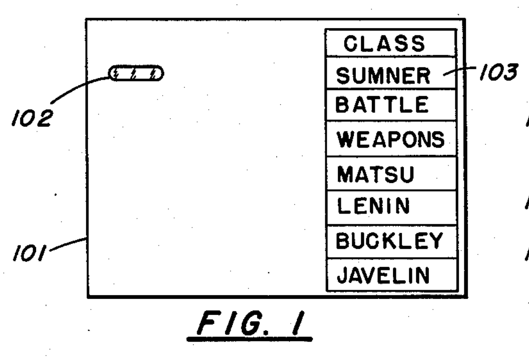
Fig. 1 shows a plan of a base member of one embodiment of the invention.
Figure 2:
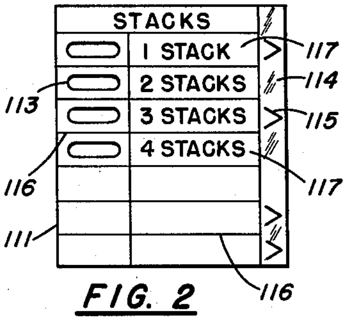
Fig. 2 is a plan view of a card suitable for use with the base of Fig. 1.
Figure 3:
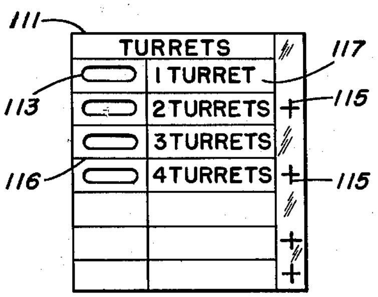
Fig. 3 illustrates a plan view of another card suitable for use with the base of Fig. 1.
Figure 4:
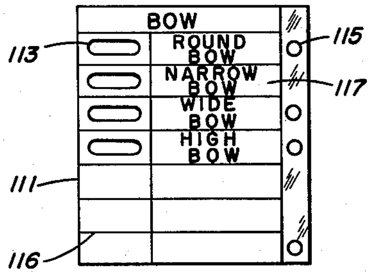
Fig. 4 shows a plan view of still another card suitable for use with the base of Fig. 1.
Figures 5, 6:
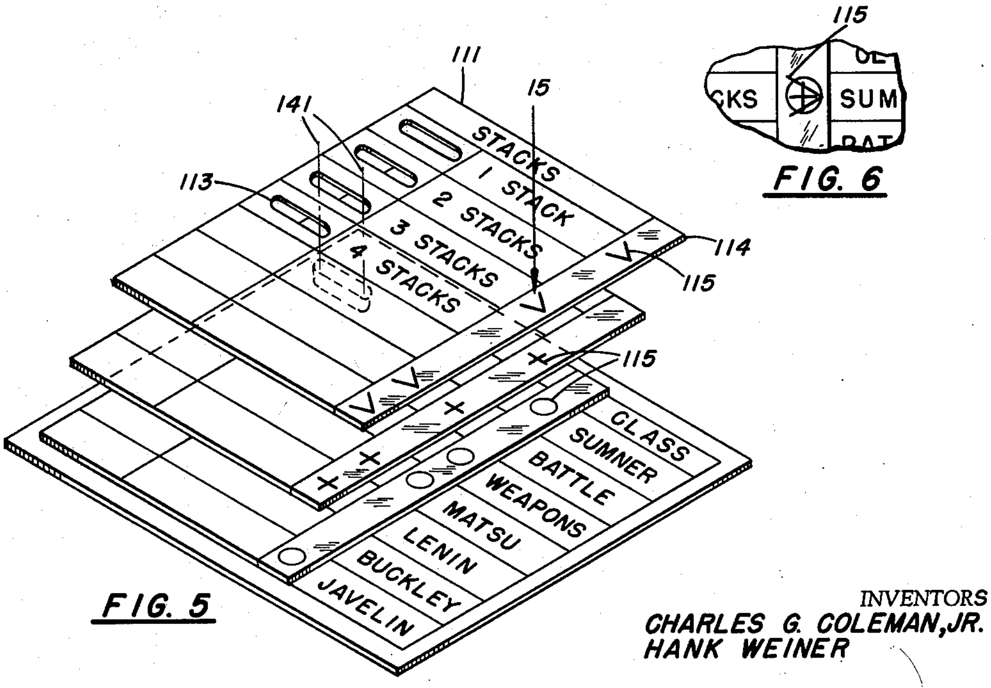
Fig. 5 is a perspective view of the cards of Figs. 2, 3, and 4 superimposed upon the base of Fig. 1.
Fig. 6 illustrates a portion of the view of Fig. 5 looking in the direction of arrow 15.

Referring now to the drawings, base member of Fig. 1 comprises flat-surfaced material 101 having a guide member 102 near one corner and a row of indicia 103 along one edge. For this embodiment, the indicia 103 are the solutions to the problems. The card of Fig. 2 has a sheet-like body 111 which is subdivided by markings 116 into two rows of parallel-arranged rectangles. Apertures 113, which are situated along one edge, are designed to have a close fit with guide member 102 of the base in Fig. 1. Another edge of this card is constructed from transparent material 114 and has feature indicia 115 thereon. The number and positions of the indicia are a function of the feature designations 117 and the indicia 103 of Fig. 1. The cards of Figs. 3 and 4 are similar to the card of Fig. 2, except they represent different features of the problems. Accordingly, the designations 117 and indicia 115 are distinctive for each card. In Fig. 5 the cards of Figs. 2, 3, and 4 are shown superimposed upon the base of Fig. 1. These cards are shown in a loose stack, i.e. not in contact, to render the indicia 115 visible for all of the cards; also, the lines which would be seen through the transparent edging 114 have been omitted for clarity. It is to be realized that in normal use the cards would be directly on top of one another. Projection lines 141, indicate that the cards are directly over one another and if stacked tightly, guide member 102 would project through the third aperture 113 of the top card. Fig. 6 shows a segmental plan view looking in the direction of arrow 15 of Fig. 5. The feature indicia 115 are superimposed producing a composite pattern.

Figure 7:
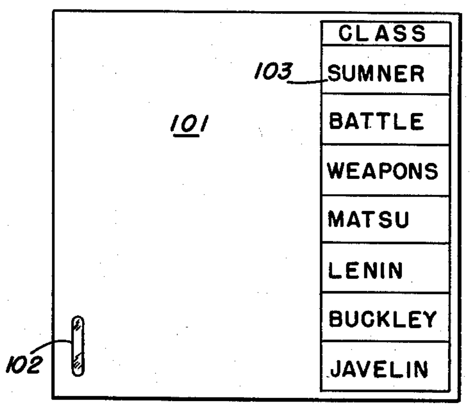
Fig. 7 shows a plan view of a base member of a further embodiment of the invention.
Figure 8:
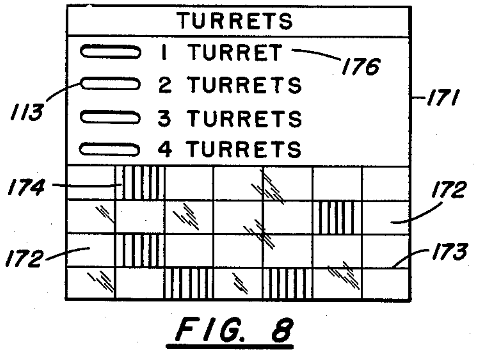
Fig. 8 is a plan view of a card suitable for use with the base of Fig. 7.
Figure 9:
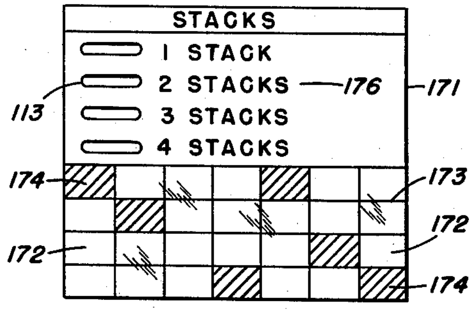
Fig. 9 is a plan view of another card suitable for use with the base of Fig. 7.
Figure 10:
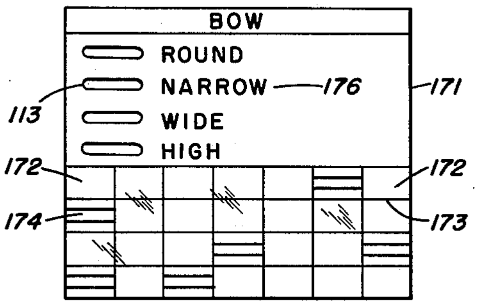
Fig. 10 is a plan view of still another card suitable for use with the base of Fig. 7.
Figure 11:
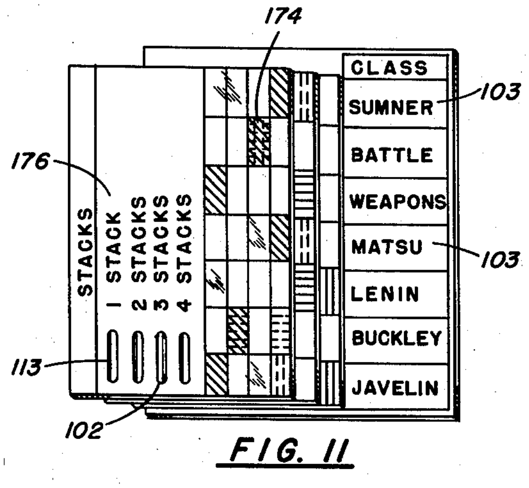
Fig. 11 is a perspective view of the cards of Figs. 8, 9, and 10 superimposed upon the base of Fig. 7.

The base of Fig. 7 is similar to that of Fig. 1, except that the guide member 102 is positioned in a different corner and is parallel to a different edge. The cards of Figs. 8, 9 and 10 have a sheet-like body portion 171; one portion 172, of which, is transparent. Markings 173 subdivide transparent portion 172 into rows of rectangles. Distinctive feature indicia 174 are provided for each card. The positions and numbers of these indicia 174 are a function of the feature designations 176 and the indicia 103 of Fig. 7. Apertures 113 in body portion 171 are located one adjacent each feature designation 176. In Fig. 11, the cards of Figs. 8, 9, and 10 are shown superimposed upon the base of Fig. 7. Some of the indicia 174 are superimposed thereby producing composite patterns.

As previously stated, this invention can be used to solve any problem, concrete or abstract, for which all of the possible solutions are known and wherein the characteristics of the problem can be recognized and associated with like characteristics in the group of possible solutions. In order to simplify the disclosure, the solution of a concrete problem is illustrated for which there are only a few solutions. Specifically, the problem is the identification of an object which the operator can see directly or indirectly by means of a photograph. The object is a ship and it is postulated that the observer knows the object is a destroyer but he does not know the class to which it belongs. His problem is to find this class.

The solutions 103 are listed along one edge of the base, shown in Fig. 1. When one of the cards of Figs. 2, 3, or 4 is placed thereon, the feature indicia 115 will be adjacent those solutions 103 having the feature corresponding to the designation 117 adjacent the guide member 102. The cards are superimposed upon the base, according to the features of the observed destroyer, until there is only one solution adjacent which there are feature indicia 115 for each card. In the stacked arrangement of Fig. 5, there is only one class, the Sumner, possessing the specific feature variation of each card. The resultant composite pattern is shown in Fig. 6. It is to be noted that not only total but also partial solutions can be observed from this embodiment; i.e. those solutions possessing some of the features but not all as well as the solution having all of the features is manifest. This may have some utility in special applications. Also, there is no need for an interpretation card since the solutions themselves are placed on the base.

In the embodiment of Figs. 7–11, the base, shown in Fig. 7, has the solutions 103 along one edge. The cards of Figs. 8, 9, and 10 are stacked thereon as is shown in Fig. 11. The feature indicia 174 aline in a row with the solutions possessing the specific feature variation of each card. The advantage of this embodiment over that of Figs. 1–6, is that a whole row of rectangles extending along one edge are available for each feature variation, i.e. if there are four features, as shown in the figures, then there are four rows of transparent rectangles. In the previous embodiment there was only one row for all of the feature variations, thus only a few variations could be used since otherwise the placement of the indicia for one feature variation might interfere with those of another. The embodiment of Figs. 7–11 also has the advantages of showing partial solutions and of eliminating the need of an interpretation card.

Obviously many modifications and variations of the present invention are possible in the light of the above teachings. It is therefore to be understood that within the scope of the appended claims the invention may be practiced otherwise than as specifically described.

What is claimed is:

1. A method of employing a base member and a plurality of partly transparent cards to obtain the solution of a problem comprising the steps of: providing a group of cards containing possible solutions wherein a true solution to the problem is contained; listing said possible solutions on said base member; separating the cards according to the several features of the problem; indicating a feature and variations thereof with each card; providing distinctive indicia on the transparent portion of each card whereby upon placement of a card in a predetermined location with respect to the base member and according to respective feature variations the possible solutions possessing the feature variation of the card are indicated; and progressively superimposing the cards upon the base member until only one possible solution is indicated by all the cards, whereby this possible solution is the true solution to the problem.

2. A multiple edge card for indicating indicium on a base card, said base card having indicia representing unknowns, the knowns being features of said unknowns comprising a transparent portion extending the length of a first edge, apertures arranged in a row along an edge which is perpendicular to said first edge for alignment with a guide means on said base card, feature designations situated adjacent to each aperture, markings for subdividing said transparent portion into rows of identical parallelograms, and feature indicia situated in some of the parallelograms whereby upon aligning apertures of at least two of said cards on said guide means corresponding to known features said indicia will superimpose each other to indicate said unknown.

3. A multiple edge card for indicating indicium on a base card, said base card having indicia representing unknowns, the knowns being features of said unknowns comprising a transparent strip extending along a first edge, apertures arranged in a row along an edge which is parallel to said first edge for alignment with a guide means on said base card, feature designations positioned adjacent to each aperture, and feature indicia situated along the transparent strip whereby upon aligning apertures of at least two of said cards on said guide means corresponding to known features said indicia will superimpose each other to indicate said unknown.

4. A progressive analyzer for solving an unknown given particular variations of features of said unknown comprising a base member, a first guide means on said base member for guiding a plurality of cards in a stack on said base member, indicia on said base member, each indicium representing a possible solution of said unknown, a plurality of cards, each of said cards representing a feature of at least one unknown, feature designations on each card, each feature designation representing a feature variation, each card having a second guide means adjacent each feature designation for engaging said first guide means, each card having a transparent portion, feature indicia on said transparent portion, each feature indicium positioned with relation to the other feature indicia, to said feature designations and to said first and second guide means to cooperate with other feature indicia to indicate the correct indicium representing said unknown.

5. A progressive analyzer as claimed in claim 4 wherein said transparent portion extends the length of a first edge of said multiple edge card and said apertures are arranged in a row along an edge of said multiple edge card which is perpendicular to said first edge.

6. A progressive analyzer as claimed in claim 4 wherein said transparent portion extends along a first edge of said multiple edge card and said apertures are arranged in a row along an edge of said multiple edge card which is parallel to said first edge.

References Cited in the file of this patent

UNITED STATES PATENTS 1,165,465 Taylor ---------------- Dec. 28, 1915